(12) United States Patent
Rake et al.

(10) Patent No.: US 10,371,252 B2
(45) Date of Patent: Aug. 6, 2019

(54) DEVICE AND METHOD FOR ADJUSTING A MOVEMENT OF AN OPERATING ELEMENT FOR A VEHICLE AUTOMATIC TRANSMISSION AND SHIFTING DEVICE FOR SHIFTING A VEHICLE AUTOMATIC TRANSMISSION

(71) Applicant: ZF Friedrichshafen AG, Friedrichshafen (DE)

(72) Inventors: Ludger Rake, Steinfeld (DE); Sascha Rosentreter, Espelkamp (DE); Karsten Straßburg, Hannover (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 543 days.

(21) Appl. No.: 15/039,113

(22) PCT Filed: Oct. 29, 2014

(86) PCT No.: PCT/EP2014/073166
§ 371 (c)(1),
(2) Date: May 25, 2016

(87) PCT Pub. No.: WO2015/078649
PCT Pub. Date: Jun. 4, 2015

(65) Prior Publication Data
US 2017/0016529 A1 Jan. 19, 2017

(30) Foreign Application Priority Data
Nov. 29, 2013 (DE) .......................... 10 2013 224 493

(51) Int. Cl.
*F16H 59/10* (2006.01)
*F16H 59/02* (2006.01)
(Continued)

(52) U.S. Cl.
CPC ......... *F16H 59/0204* (2013.01); *F16H 59/10* (2013.01); *F16H 59/22* (2013.01);
(Continued)

(58) Field of Classification Search
CPC ..... F16H 59/0204; F16H 59/105; F16H 61/22
See application file for complete search history.

(56) References Cited

U.S. PATENT DOCUMENTS 7,712,392 B2 5/2010 Molkow et al.
8,316,734 B2 * 11/2012 Giefer ................. F16H 59/0204
74/473.12
(Continued)

FOREIGN PATENT DOCUMENTS

DE   20 2008 012 778 U1   1/2009
DE   10 2012 107 869 A1   2/2014
EP       2 792 910 A2     10/2014

OTHER PUBLICATIONS

International Search Report dated Jun. 22, 2015 in International Application No. PCT/EP2014/073166, 6 pages, German Language.
(Continued)

*Primary Examiner* — David M Fenstermacher
(74) *Attorney, Agent, or Firm* — Brinks Gilson & Lione

(57) ABSTRACT

The disclosure provides a device for regulating a movement of an operating element for an automatic transmission of a vehicle. The device comprises a rotatable shaft and a bearing element for bearing the operating element. The bearing element can be moved together with the operating element relatively to the shaft with respect to a first axis of movement and between a rest position and a deflection position with respect to a second axis of movement. The device is characterized in that on the shaft are arranged a locking element for locking the movement of the bearing element from the rest position to the deflection position and/or a resetting
(Continued)

element for resetting the bearing element from the deflection position to the rest position.

18 Claims, 4 Drawing Sheets

(51) Int. Cl.
  *F16H 61/22* (2006.01)
  *F16H 59/22* (2006.01)
  *F16H 61/24* (2006.01)
(52) U.S. Cl.
  CPC ..... *F16H 61/22* (2013.01); *F16H 2059/0295* (2013.01); *F16H 2061/241* (2013.01)

(56) References Cited

U.S. PATENT DOCUMENTS

| | | | |
|---|---|---|---|
| 8,448,536 B2* | 5/2013 | Giefer | F16H 59/044 74/335 |
| 8,464,601 B2* | 6/2013 | Giefer | F16H 59/10 74/473.12 |
| 8,490,509 B2* | 7/2013 | Giefer | F16H 59/10 74/473.1 |
| 8,955,405 B2* | 2/2015 | Heo | F16H 59/04 74/473.18 |
| 9,476,500 B2* | 10/2016 | Skogward | F16H 59/04 |
| 9,587,761 B2* | 3/2017 | Spohn | F16K 31/105 |

OTHER PUBLICATIONS

Written Opinion of the International Search Authority dated Jun. 22, 2015 in International Application No. PCT/EP2014/073166, 15 pages, German Language.

English Language Translation of International Search Report dated Jun. 22, 2015 in International Application No. PCT/EP2014/073166, 3 pages.

Office Action of Priority Application DE102013224493.2 dated Aug. 7, 2014, 7 pages, German Language.

* cited by examiner

DEVICE AND METHOD FOR ADJUSTING A MOVEMENT OF AN OPERATING ELEMENT FOR A VEHICLE AUTOMATIC TRANSMISSION AND SHIFTING DEVICE FOR SHIFTING A VEHICLE AUTOMATIC TRANSMISSION

This application is a filing under 35 U.S.C. § 371 of International Patent Application PCT/EP2014/073166, filed Oct. 29, 2014, and claims the priority of DE 10 2013 224 493.2, filed Nov. 29, 2013. These applications are incorporated by reference herein in their entirety.

The present disclosure relates to an apparatus for regulating a movement of an operating element for an automatic transmission of a vehicle, and to the method for regulating a movement of an operating element for an automatic transmission of a vehicle as well as a switching device for shifting an automatic transmissions of a vehicle.

In the automotive sector, shift mechanisms for automatic transmission can be equipped with multistable gear positions, such as "P", "R", "N" and "D", as well as the so-called "manual shift gate". Here, one can in particular change from gear "D" to the manual shift gate.

DE 10 2005 023 926 A1 discloses an electrical shifting device for a motor vehicle, with a gearshift lever and with an electric actuator, which can switch on or switch off a shift stop for the gearshift lever, wherein in at least one actuation path of the gearshift lever is arranged a limiting element whose expansion within an actuating path of the gearshift lever can be changed by the actuator.

Against this background, the present disclosure provides an improved apparatus for regulating a movement of an operating element for an automatic transmission of a vehicle, and an improved switching device for shifting an automatic transmission of a vehicle according to the main claims. Advantageous embodiments result from the dependent claims and the following description.

According to the embodiments of the present disclosure, in particular a shift mechanism can be provided with locking and resetting system for automatic transmission of vehicles. For example, it can be made possible to lock a shift path of a gearshift lever and to move the gearshift lever from one stable position to another stable position. Thus, there can be realized the functions of locking the shifting path, of a gearshift lever and resetting or moving the gearshift lever from one stable position to a second stable position by two different elements.

Thus the embodiments of the present disclosure can bring both cost advantages and structural advantages by function-related separation of elements or function-related provision of separate elements. The separation of the functions of resetting and locking into two elements, for example with a common drive, makes the construction not only cost effective but also mechanically robust. The locking element and the resetting element can be formed functionally specific. Thus, an unwanted change to the manual shift gate can be prevented by blocking the corresponding movement. Also, the same device can move an operating element intended for selecting the transmission gear out of the manual shift gate or back. Furthermore, this also allows a free configuration of functions because the elements can be designed as interchangeable parts, wherein in particular the function variants of only locking, only resetting, and locking and resetting can be realized in a basic design.

An apparatus for regulating a movement of an operating element for an automatic transmission of a vehicle, wherein the apparatus comprises a rotatable shaft and a bearing means for supporting the operating element, wherein the bearing means can be moved together with the operating element relative to the shaft with respect to a first axis of movement between a rest position and a deflection position element with respect to a second axis of movement, is characterized in that on the shaft is arranged a blocking element for blocking a movement of the bearing means from the rest position to the deflection position, and additionally or alternatively, a resetting element for resetting the bearing means from the deflection position to the rest position.

The apparatus can be a device or a part of a device of the vehicle. The vehicle can be motor vehicle, in particular a road-bound vehicle such as a passenger car or a truck. The operating element can be a gear shift lever of the automatic transmission, which can be, for example, operated by a driver of the vehicle by hand to set different gears of the automatic transmission. For example, the driver can operate the operating element, for example, by pivoting and/or sliding between the positions P for parking, N for neutral, R for reversing and D for driving and from D to a manual shift gate. The bearing means can be designed to accommodate and hold the operating element and allow a movement thereof for switching. The first axis of movement can be associated with a movement of the operating element between the positions P, N, R and D in an automatic shift. The second axis of movement can be associated with a movement of the operating element between the automatic and manual shift gates. The rest position can correspond to a position of the operating element in the automatic shift gate, especially in the position D, the deflection position can correspond to a position of the operating element in the manual shift gate.

An axis of rotation of the shaft can be arranged stationary with respect to the device during a movement of the operating element. The locking element can be provided as an element formed separately from the resetting element and the shaft. The resetting element can be provided as an element formed separately from the locking element and the shaft. The locking element and additionally or alternatively the resetting element can be designed attached to the shaft rotating therewith. The device can comprise either the locking element or the resetting element. The locking element or the resetting element can alternatively also be formed integrally with the shaft.

In an embodiment, the locking element can comprise a locking projection extending radially from a peripheral surface of the shaft in a section of a circumference of the shaft. In this case, the locking element can comprise a cam which extends from a sleeve-shaped body of the locking element. Such an embodiment offers the advantage that by means of a projection of a simple form to produce a secure and stable blocking of the movement of the bearing means and thus the operating element with respect to the second axis of movement is made possible.

Also, the resetting element can comprise a disk centrically or eccentrically arranged on the shaft. The thickness of the disk in at least one section of a circumference thereof can be increasing from an initial thickness to a resetting thickness. An outer diameter of the disk can be larger than an outer diameter of the shaft. The thickness of the disk can be increasing in a ramp form. The thickness of the disk can be adapted to form a resetting contour of the resetting element. For example, the resetting can be designed as a cam. Such an embodiment offers the advantage that by means of the disk with a resetting profile a particularly reliable and, in terms of the power transmission, advantageous resetting can be realized.

Further, the locking member can be arranged in a first circumferential section of the shaft and the resetting element can be arranged in a second circumferential section of the shaft different from the first circumferential section. In this case, the locking element and the resetting element can be arranged in a common or different longitudinal extension section of the shaft. In particular, the locking element can be arranged in a first circumferential hemisphere of the shaft and the resetting element can be arranged in a second circumferential hemisphere of the shaft. A circumferential hemisphere can also extend more or less over one half the circumference of the shaft. Such an embodiment has the advantage that, depending on the rotational position and rotational orientation of the shaft, a respective function, i.e., locking or resetting can be performed reliably and accurately.

The bearing means can also comprise an engagement section for receiving the locking element. The engagement section of the bearing means can be formed as a recess and, additionally or alternatively, a projection of the bearing means. Depending on a rotational orientation of the shaft, in a locking position of the shaft the locking element can be arranged at least partially in the engagement section. The engagement section can be engaged by the locking element. In the present locking position of the shaft, the locking element can mesh in the engagement section, be arranged against the engagement section or at least partially project into the engagement section. Such an embodiment offers the advantage that a secure, stable and reliable locking of the movement of the operating element with respect to the second axis of movement is made possible by the interaction of the locking element and the engagement section.

In addition, the bearing means can comprise an abutment surface for interaction with the resetting element. Depending on a rotational orientation of the shaft, in a return movement of the shaft the resetting element can be at least partially disposed in abutment against the abutment surface. Such an embodiment has the advantage that by the interaction of the resetting element and the abutment surface a safe and reliable resetting or returning of the operating element from the deflection position to the rest position with respect to the second axis of movement is possible.

Furthermore, it can be provided a drive device for driving the shaft. Here, the drive device and the shaft can be coupled to one another by means of a worm gear. A wheel of the worm gear can be arranged on the shaft and a worm of the worm gear can be arranged on the drive device. The worm gear can be designed to effect a self-locking of the worm gear. The drive device and the shaft can be coupled to one another by means of another screw rolling gear or a different type of gear. Such an embodiment offers the advantage that by means of the drive device and the worm gear, a high gear ratio and, optionally, also self-locking and thus a high precision during the rotary movement of the shaft are made possible.

According to an embodiment, the locking element, the resetting element, and a worm wheel of a worm gear provided for driving the shaft can be arranged on the shaft. In this case, the locking element can be formed as a cam and be arranged on a side of the resetting element formed with a return contour facing away from the worm wheel on the shaft. In particular, the worm wheel and the resetting element can be formed integrally as one piece. Such a configuration offers the advantage that a simple and robust device for locking and returning the operating element can be provided.

A shifting device for shifting an automatic transmission of a vehicle, wherein the shifting device comprises an operating element which is adapted to be shifted between an automatic and a manual shift gates of the automatic transmission, is characterized in that the shifting device comprises an embodiment of the aforementioned device for regulating a movement of the operating element, wherein the second axis of movement represents a change axis between the automatic and the manual shift gates, wherein the rest position is associated with the automatic shift gate and the deflection position is associated with the manual shift gate.

In connection with the shifting device, one embodiment of the aforementioned device can be advantageously used for adjusting the movement of the operating element.

A method for regulating a movement of an operating element for an automatic transmission of a vehicle, wherein the method is performed in connection with a device having a rotatable shaft and a bearing means for supporting the operating element, wherein the bearing means can be moved together with the operating element relative to the shaft about a first axis of movement and between a rest position and a deflection position about a second axis of movement, wherein on the shaft is arranged a locking element for blocking the movement of the bearing means from the rest position to the deflection position and/or a resetting element for resetting the bearing means from the deflection position to the rest position, has the following step:

Rotating the shaft in order to arrange the locking element in engagement with the bearing means in a locking position, to arrange the locking element and the restoring element out of contact with the bearing means in a release position and/or in a return movement between the release position and the locking position to arrange the resetting element in abutment against the bearing means.

The method can be advantageously performed using an embodiment of the above-mentioned device for adjusting to adjust a movement of the operating element. In the step of rotating, the shaft can be rotated in at least one direction of rotation. In particular, in the step of rotating the shaft can be rotated so that at a constant rotational direction from the release position either the return movement can be executed and then the locking position is reached or the locking position can be directly reached.

The disclosure will be explained in more detail based on the accompanying drawings. The drawings show:

In the following description of preferred embodiments of the present disclosure, same or similar reference numerals are used for similarly acting elements shown in the various figures. A repeated description of these elements is dispensed with.

Figure 1:
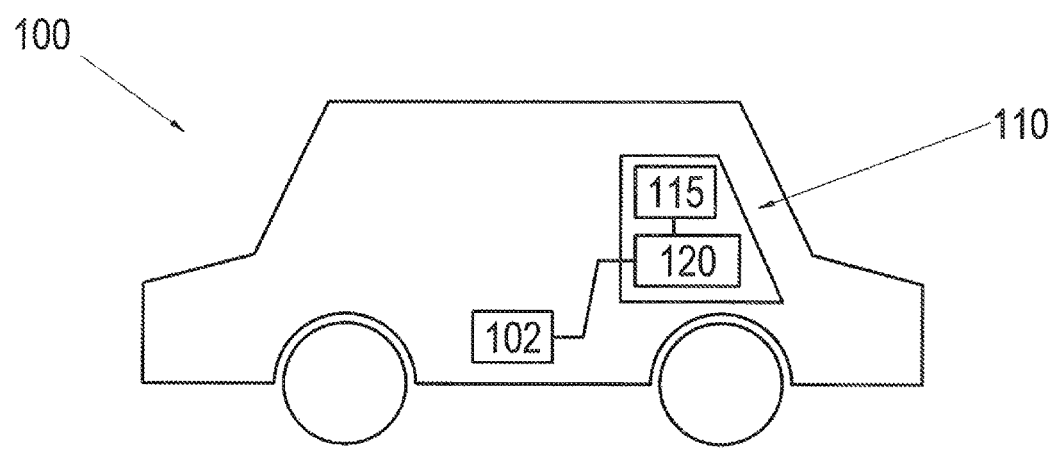
FIG. 1 shows a schematic representation of a vehicle with a shifting device according to one embodiment of the present disclosure.

FIG. 1 shows a schematic representation of a vehicle 100 with a shifting device according to an embodiment of the present disclosure. Of the vehicle 100, FIG. 1 shows here a gearbox or automatic transmission 102, the shifting device 110, an operating element 115 and a setting device 120. The automatic transmission 102 is connected with the shifting device 110 in a connection with a signal transmission capability. The shifting device 110 is configured to shift the automatic transmission 102 of the vehicle 100. The shifting device 110 comprises the operating element 115 and the setting device 120. The setting device 120 is configured to adjust a movement of the operating element 115 for the automatic transmission 102 of the vehicle 100. Thus, the setting device 120 can also be called a device for regulating a movement of the operating element 115 for the automatic transmission 102 of the vehicle 100.

The operating element 115 can be a gearshift lever for the automatic transmission 102 of the vehicle 100, which, for example, can be operated by a driver by hand to set different gears of the automatic transmissions 102. Thus, the operating element 115 can be shifted by pivoting and/or pushing in particular between positions P for parking, N for neutral, R for reverse driving and D for driving, and from the position D to a manual shift gate. The setting device 120 is configured to adjust a movement of the operating element 115 with respect to the manual shift gate, in particular to block a movement to the manual shift gate and/or to cause a resetting of the manual gate. In the following text, the shifting device 110 or the setting device 120 is discussed in more detail.

Figure 2:
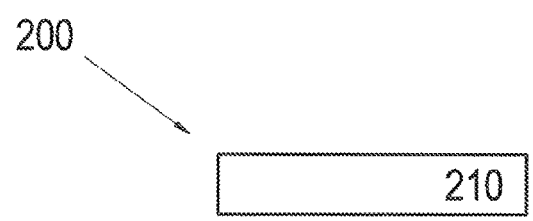
FIG. 2 shows a flowchart of a method of adjusting according to an embodiment of the present disclosure.

FIG. 2 shows a flow diagram of a method 200 for regulating a movement of an operating element for an automatic transmission of a vehicle according to an embodiment of the present disclosure. Using a setting device such as the setting device of FIG. 1, the method 200 can be advantageously executed to set a movement of the operating element.

Thus, the method 200 can be executed in connection with a device comprising a rotatable shaft and a bearing means for supporting the operating element. The bearing means can move together with the operating element relative to the shaft about a first axis of movement and between a rest position and a deflection position about a second axis of movement. On the shaft is arranged a locking element for blocking a movement of the bearing means from the rest position to the deflection position, and additionally or alternatively, a resetting element for resetting the bearing means from the deflection position to the rest position.

The method 200 includes a step 210 of rotating the shaft to bring to a locked position the locking element in engagement with the bearing means and, in a release position, to arrange the locking element and the resetting element out of contact with the bearing means and, additionally or alternatively, at a return movement between the release position and the locking position to arrange the resetting element to bear against the bearing means. In this case, in step 210 of rotating, the shaft can rotate in at least one direction of rotation. In particular, in step 210 of rotating, the shaft is rotatable so that with a constant rotation direction starting from the release position either the resetting movement can be executed and then the locking position is reached or the locking position is reached directly.

Figure 3A:
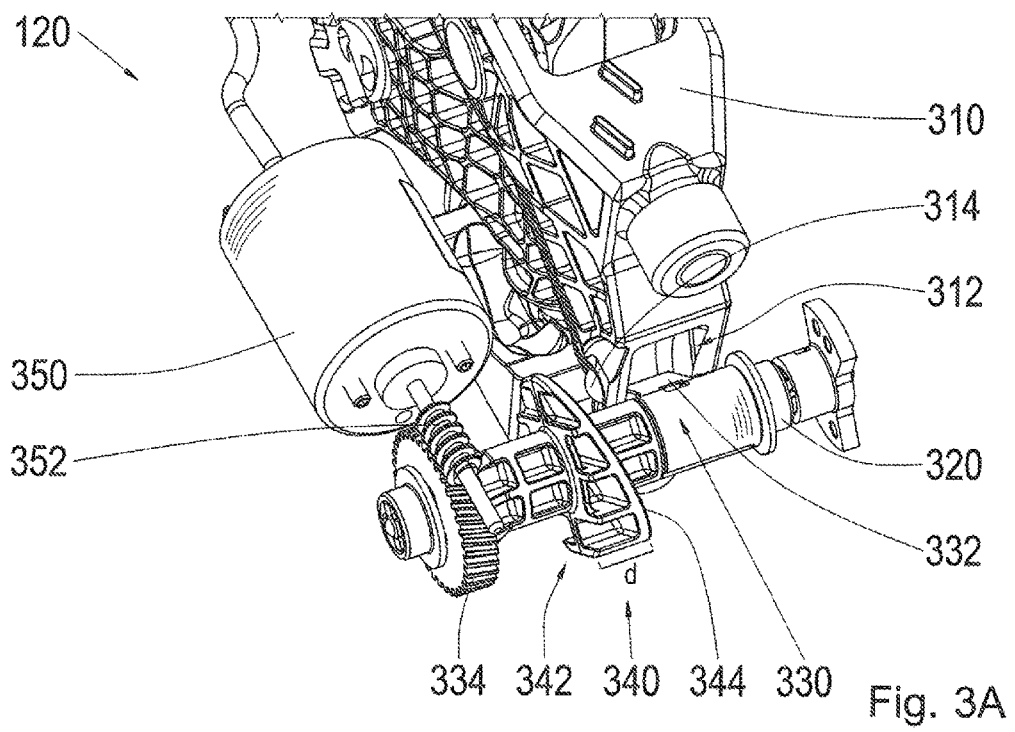
FIGS. 3A to 3E show perspective views of an adjustment device according to an embodiment of the present disclosure in various states.

FIG. 3A shows a perspective view of a setting device 120 according to an embodiment of the present disclosure. The setting device 120 is the setting device of the shifting device in FIG. 1.

Of the setting device 120 are shown in this case a bearing means 310 with an engagement section 312 and an abutment surface 314, a rotatable shaft 320 on which are arranged a locking element 330 having a locking protrusion 332 and a worm wheel 334, and a resetting element 340 with a disk 342 and a resetting contour 344, and a drive device 350 with a screw 352. Here, the setting device 120 is shown in FIG. 3A in a state in which the shaft 320 is arranged in a blocking position.

The setting device 120 is part of the shifting device for shifting an automatic transmission of a vehicle of FIG. 1. In this case, the shifting device comprises the operating element, which is designed to be moved between an automatic and a manual shift gate of the automatic transmission, and the setting device 120. The setting device 120 or an apparatus for regulating a movement of the operating element for the automatic transmission of the vehicle comprises the bearing means 310 for supporting the operating element, the rotatable shaft 320 and the drive device 350.

The bearing means 310 can move together with the operating element relative to the shaft 320 about a first axis of movement, and between a rest position and a deflection position about a second axis of movement. The first axis of movement is associated with a movement of the operating element between the positions P, N, R and D in an automatic shift gate. The second axis of movement is associated with a movement of the operating element between the automatic and manual shift gate. In other words, the second axis of movement represents a change axis between the automatic and the manual shift gate of the automatic transmission. The rest position corresponds to a position of the operating element in the automatic shift gate, especially in the position D, and the deflection position corresponds to a position of the operating element in the manual shift gate. The bearing means 310 is configured to accommodate and hold the operating element, and to make possible a movement thereof during shifting operations.

The locking element 330 is arranged on the shaft 320 to block the movement of the bearing means 310 from the rest position into the deflection position. Further arranged on the shaft 320 is the resetting element 340 for resetting the bearing means 310 from the deflection position into the rest. During a movement of the bearing means 310 and thus also of the operating element, a rotation axis of the shaft 320 is stationary arranged with respect to the setting device 120. In the illustration of FIG. 3A, the bearing means 310, thus also the operating element, are arranged in the rest position with respect to the second axis of movement. In other words, the bearing means 310, thus also the operating element, are arranged in the position P, R or N of the automatic transmission, wherein the manual shift gate or a change into the same is locked by the locking element 330.

The locking element 330 has a locking projection 332 located in a section of a circumference of the shaft 320 and extending radially away from a peripheral surface of the shaft 320. The locking projection 332 is formed as a cam which extends from a sleeve-shaped body of the locking element 330. According to the embodiment of the present disclosure shown in FIG. 3A, the worm wheel 334 is arranged on the shaft 320 separately from the locking element 330. According to another embodiment, the worm wheel 334 is formed integrally with the locking element 330.

The resetting element 340 has a disk 342 arranged on the shaft 320. The thickness of the disk 342 in a respective counterpart section of a periphery increases from an initial thickness to a resetting thickness to form the resetting contour 344 of the resetting element 340. The thickness of the disk 342 increases in a ramp form. The disc 342 is positioned with a surface forming the ramp obliquely to an axis of rotation of the shaft 320. Depending on the embodiment of the present disclosure, the disk 342 is arranged centrally or eccentrically to the shaft 320. For example, the disk 342 is formed as a cam.

The locking element 330 is arranged in a first circumferential section of the shaft 320. The resetting element 340 is arranged in a second circumferential section of the shaft 320 different from the first peripheral section. In this case, the locking element 330 and the resetting element 340 according to the embodiment of the present disclosure shown in FIG. 3A are arranged in a different longitudinal extension section of the shaft 320. According to another embodiment, the locking element 330 and the resetting element 340 are arranged in a common longitudinal extension section of the shaft 320. In particular, the locking projection 332 is arranged in a first circumferential hemisphere of the shaft 320 and the resetting contour 344 is arranged in a second circumferential hemisphere of the shaft 320. When the shaft 320 shown in FIG. 3A is in the locking position, the locking projection 332 is facing the bearing means 310 and the resetting contour 344 is facing away from the bearing means 310.

The locking element 330 is provided as an element formed separately from the resetting element 340 and the shaft 320. The resetting element 340 is provided as an element formed separately from the locking element 330 and the shaft 320. According to the embodiment of the present disclosure shown in FIG. 3A, the locking element 330 and the resetting element 340 are fixed to the shaft 320 so they can rotate therewith. According to another embodiment, the locking member 330 or the resetting element 340 are formed integrally with the shaft 320. According to an embodiment, the locking element 330 and additionally or alternatively, the resetting element 340 are removably attached to the shaft 320. According to one embodiment, the setting device 120 comprises only either the locking element 330 or the resetting element 340.

The bearing means 310 has the engagement portion 312 for receiving the locking element 330 and the locking projection 332. The bearing means 310 further comprises the abutment surface 314 for interacting with the resetting element 340, more specifically with the resetting profile 344 of the disk 342. The engagement section 312 of the bearing means is formed as a recess 310 and additionally or alternatively as a projection of the bearing means 310. In the blocking position of the shaft 320, the locking protrusion 332 is at least partially arranged in the engagement section 312 of the bearing means 310. The engagement section 312 is engaged by the locking protrusion 332. When the shaft 320 is in the locked position, the resetting profile 344 of the resetting element 340 is arranged spaced from the abutment surface 314 of the bearing means 310. Depending on a rotational orientation of the shaft 320, during the return movement of the shaft the resetting contour 344 of the resetting element 340 is at least partially arranged in abutment against the abutment surface 314 of the bearing means 310.

The drive device 350 is adapted to drive the shaft 320 to cause a rotational movement of the shaft 320. In this case, the drive device 350 and the shaft 320 are coupled to each other by means of a worm gear. The worm gear comprises the worm wheel 334 and the worm 352. The worm wheel of the worm gear 334 is in this case arranged on the shaft 320. According to the embodiment of the present invention shown in FIG. 3A, the worm gear is arranged on a side of the reset element 340 facing away from the locking member 330, wherein the worm wheel 334 is connected to the resetting element 340. According to an embodiment of the present disclosure, the worm wheel 334 can be coupled with the shaft 320 separately from the resetting element 340. According to a further embodiment of the present disclosure, the worm gear may be arranged adjacent to the locking element 330, wherein the worm gear is arranged on the side of the locking element 330 facing away from the resetting element 340. The screw 352 of the worm gear is arranged on the drive device 350. The worm gear is formed to cause a self-locking of the worm gear. According to another embodiment, the drive device 350 and the shaft 320 are coupled to each other by means of another screw rolling gear or other type of gear.

Thus, in the setting device 120 according to the embodiment of the present disclosure shown in FIG. 3A, the locking element 330, the resetting element 340 and the worm wheel 334 of the worm gear provided for driving the shaft 320 are arranged on the shaft 320. The locking protrusion 332 of the control element 330 is formed as a cam and is arranged on a side of the resetting element 340, which comprises the disk 342 with the resetting contour 344, facing away from the worm wheel 334. The resetting element 340 is arranged adjacent to the locking element 330 separate therefrom.

Figure 3B:
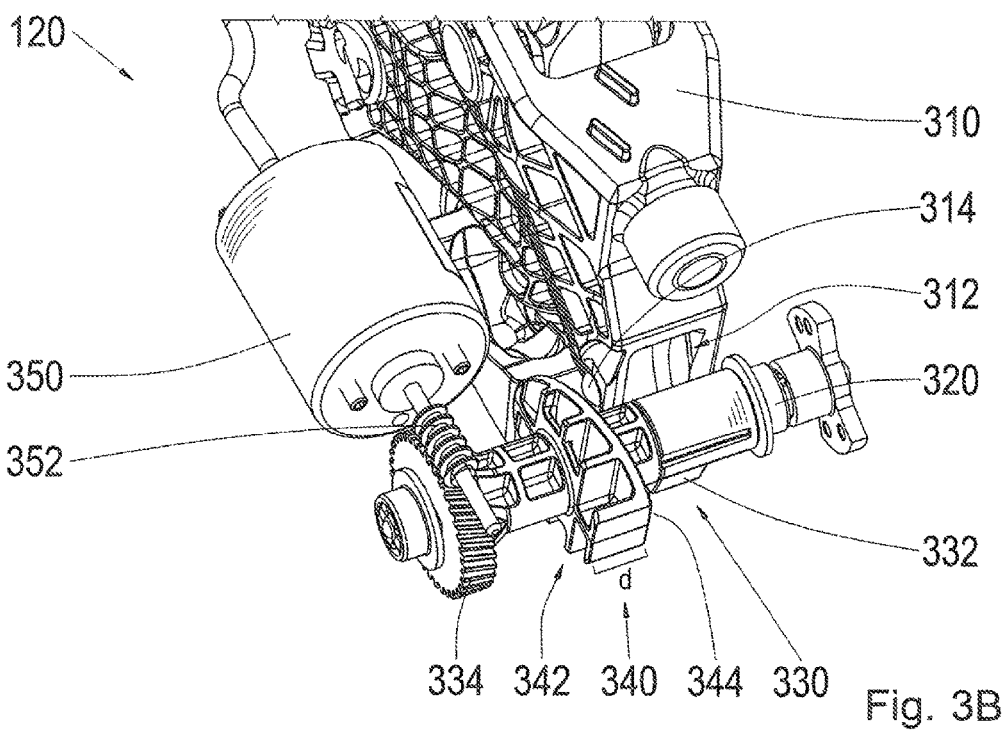

FIG. 3B shows the setting device 120 in FIG. 3A in a state in which the shaft 320 is arranged in a release position. In the illustration of FIG. 3B, the bearing means 310, and thus also the operating element, are arranged in the rest position with respect to the second axis of movement. The bearing means 310, and thus also the operating element, are arranged in the position D of the automatic transmission, wherein the manual shift gate or a switch to it is enabled. In the release position of the shaft 320, the locking protrusion 332 of the locking element 330 is rotated away or spaced from the engagement portion 312 of the bearing means 310. The resetting contour 344 is spaced by a smaller distance from the bearing means 310 and the abutment surface 314 than in the locking position shown in FIG. 3A. Starting from the locking position shown in FIG. 3A, the shaft 320 is rotated by the drive device 350 and the worm gear by a quarter turn into the release position shown in FIG. 3B.

Figure 3C:
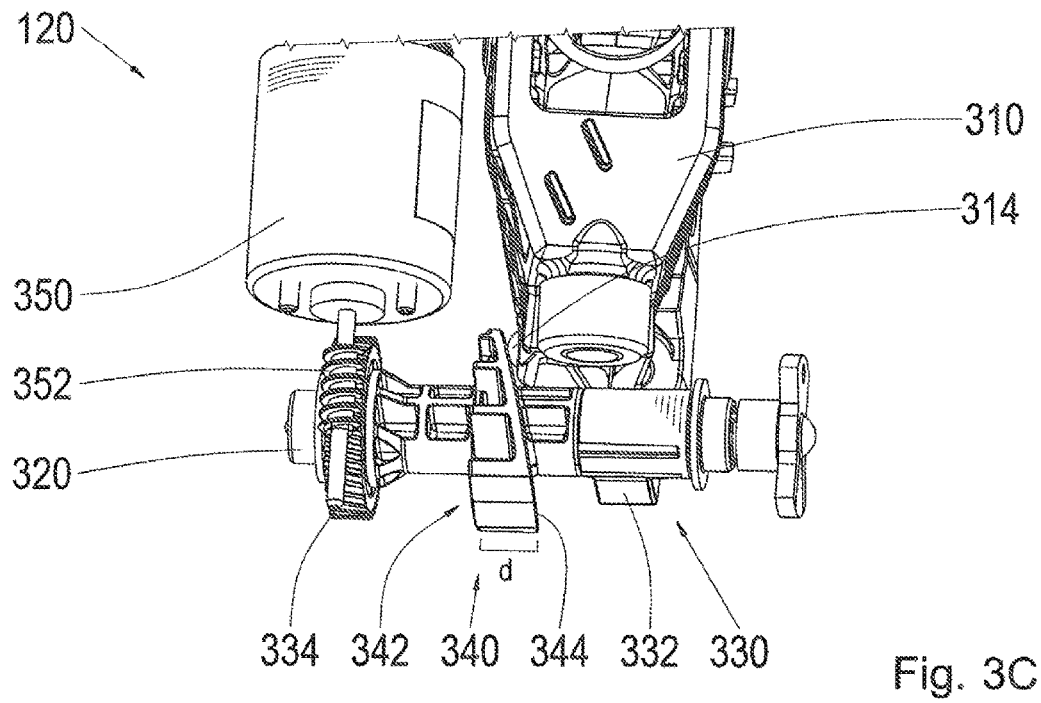

FIG. 3C shows the setting device 120 from FIGS. 3A and 3B in a state in which the shaft 320 is arranged in the release position, and the bearing means 310, thus also the operating element, is arranged in the deflection position with respect to the second axis of movement. The bearing means 310, thus also the operating element, is arranged in the position M, that is in the manual shift gate of the automatic transmission, wherein the manual shift gate is released.

Figure 3D:
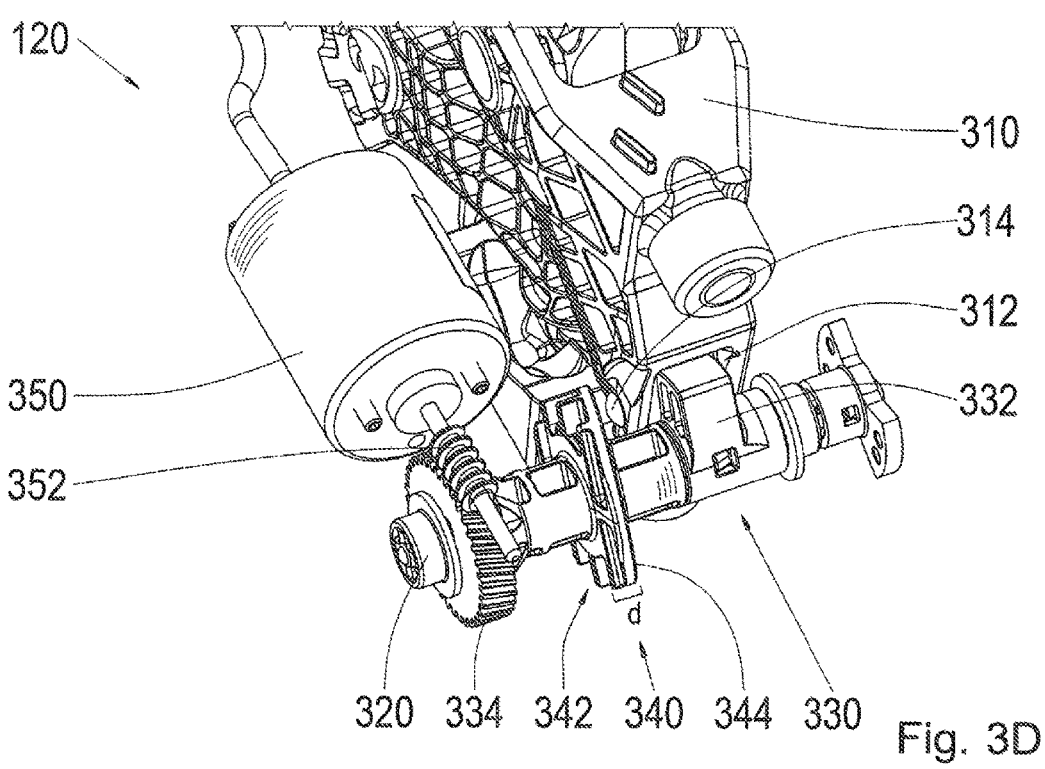
Figure 3E:
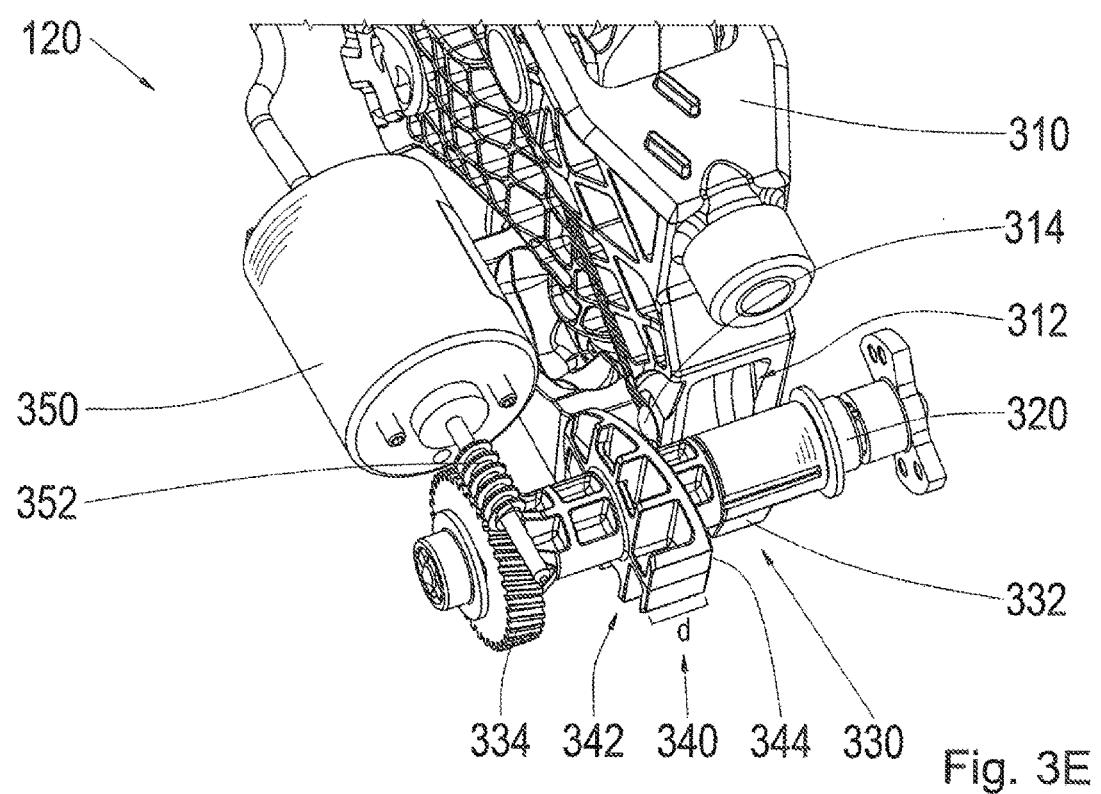

FIG. 3D shows the setting device 120 of FIGS. 3A to 3C, in a state after a return movement between the release position and the locking position of the shaft 320. In the illustration of FIG. 3D, the bearing means 310, thus also the operating element, is moved back by the resetting element 340 from the deflection position to the rest position with respect to the second axis of movement. Here, the bearing means 310, thus also the operating element, is moved from the manual shift gate back to the position D of the automatic transmission. Thus, a resetting movement can be performed in that the operating device and the worm gear cause a half rotation of the shaft 320 from the state of the setting device 120 shown in FIG. 3C to the state of the setting device 120 shown in FIG. 3D. The resetting contour 344 is spaced from the bearing means 310 or the abutment surface 314 by a smaller distance than in the locking position of the shaft 320 shown in FIG. 3A. FIG. 3E shows the setting device 120 of FIGS. 3A to 3D in a state corresponding to the state shown in FIG. 3B.

Referring to FIGS. 3A to 3E, the states shown in the setting device 120 are reached by rotating the shaft 320, for example, in one direction by the drive device 350 and the worm gear as follows: Starting from the locking position shown in FIG. 3A, the release position shown in FIG. 3B and FIG. 3C is reached by a quarter rotation of the shaft 320, whereupon during a rotation of the shaft 320 the resetting movement is performed and the state shown in FIG. 3D is reached.

The embodiments described and shown in the figures are chosen only by way of example. Different embodiments can be combined wholly or in respect of individual features. An embodiment can also be supplemented by features of another embodiment. Furthermore, steps of the disclosure can be repeated and executed in a sequence other than the sequence described.

If an embodiment comprises an "and/or" link between a first feature and a second feature, it may be read so that the embodiment according to one form of execution comprises both the first feature and the second feature and according to a second form of execution, it comprises either only the first feature or only the second feature.

REFERENCE NUMERALS

100 Vehicle
102 Automatic transmission
110 Shifting device
115 Operating element
120 Setting device
200 Method for setting
210 Step of rotating
310 Bearing means
312 Engagement section
314 Abutment surface
320 Shaft
330 Locking element
332 Locking protrusion
334 Worm wheel
340 Resetting element
342 Disk
344 Resetting contour
350 Drive device
352 Worm
d Thickness of the disk

The invention claimed is:

1. A device for regulating movement in an automatic transmission of a vehicle, the device comprising:
a rotatable shaft, and
a bearing element, wherein the bearing element is configured to move relative to the shaft with respect to a first axis of movement and between a rest position and a deflection position with respect to a second axis of movement,
wherein on the shaft is arranged at least one of a locking element to lock a movement of the bearing element from the rest position to the deflection position or a resetting element for resetting the bearing element from the deflection position to the rest position, and
wherein the bearing element comprises an engagement section for receiving the locking element.

2. The device according to claim 1, wherein the locking element comprises a locking protrusion extending radially in a section of the circumference of the shaft from a peripheral surface of the shaft.

3. The device according to claim 2, wherein a blocking position of the device comprises at least partial engagement of the locking protrusion with the engagement section and a release position of the device comprises the locking protrusion disengaged with the engagement portion.

4. The device according to claim 3, wherein a quarter turn of the shaft transitions the device from the blocking position to the release position.

5. The device according to claim 1, wherein the resetting element comprises a disk arranged on the shaft, wherein the thickness of the disk in at least one section of its circumference increases from an initial thickness to a resetting thickness.

6. The device according to claim 5, wherein the thickness of the disk increases in the direction of rotation of the shaft.

7. The device according to claim 5, wherein the resetting element is arranged eccentrically on the shaft.

8. The device according to claim 1, wherein on the shaft are arranged the locking element, the resetting element and a worm wheel of a worm gear provided for driving the shaft, wherein the locking element is formed as a cam and is arranged on the shaft on a side of the resetting element facing away from the worm wheel, wherein the resetting element is formed as a disk with a resetting contour.

9. The device according to claim 8, wherein the resetting contour is oblique to an axis of rotation of the shaft.

10. The device according to claim 1, wherein the bearing element comprises an abutment surface for interaction with the resetting element.

11. The device according to claim 1, wherein the locking element and the resetting element are arranged on the shaft.

12. The device according to claim 1, wherein the shaft is rotatable in only one direction.

13. The device according to claim 1, further comprising a drive device for driving the shaft, wherein the drive device and the shaft can be connected by a worm gear.

14. The device according to claim 13, wherein the worm gear comprises a worm wheel, wherein the worm wheel is formed integrally with the locking element.

15. The device according to claim 1, wherein the engagement section is a recess.

16. The device according to claim 1, wherein the locking element is arranged in a first circumferential section of the shaft and the resetting element is arranged in a second circumferential section of the shaft different from the first circumferential section.

17. The device according to claim 16, wherein a locking protrusion extends radially from the locking element, wherein the resetting element comprises a resetting contour, wherein the locking protrusion faces the bearing element when the resetting contour faces away from the bearing element.

18. A shifting device for shifting an automatic transmission of a vehicle, the shifting device comprises:
an operating element configured to be moved between an automatic and a manual shift gate of the automatic transmission,
a device for regulating movement comprising:
a rotatable shaft and
a bearing element for holding the operating element, wherein the bearing element is configured to be moved together with the operating element relative to the shaft with respect to a first axis of movement and between a rest position and a deflection position with respect to a second axis of movement,
wherein on the shaft is arranged at least one of a locking element to lock a movement of the bearing element from the rest position to the deflection position or a resetting element for resetting the bearing element from the deflection position to the rest position,
wherein the second axis of movement represents a change axis between the automatic and the manual shift gate, wherein the rest position is associated with the automatic shift gate and the deflection position is associated with the manual shift gate.

\* \* \* \* \*